Jan. 27, 1959　　　H. B. SMITH　　　2,871,468
DOPPLER RADAR ACQUISITION SYSTEM
Filed Oct. 26, 1955

WITNESSES

INVENTOR
Harry B. Smith
BY
ATTORNEY

United States Patent Office 2,871,468
Patented Jan. 27, 1959

2,871,468

DOPPLER RADAR ACQUISITION SYSTEM

Harry B. Smith, Catonsville, Md., assignor to Westinghouse Electric Corporation, East Pittsburgh, Pa., a corporation of Pennsylvania Application October 26, 1955, Serial No. 542,820

6 Claims. (Cl. 343—8)

This invention relates to radar target acquisition systems and more particularly to means for achieving velocity acquisition in Doppler radar apparatus.

In Doppler radar frequency discrimination is used to distinguish moving targets from stationary targets. In the frequency discrimination process moving targets are identified in accordance with the Doppler frequency which is defined as the difference between transmitted and received frequencies. This Doppler frequency arises as a result of the relative motion of the target and the radar set, and is a direct measure of the radial component of the relative motion. By providing suitable filtering apparatus in the radar receiver, signals other than those having a Doppler frequency can be eliminated and the Doppler signal can then be used to indicate the existence of a moving target.

Since the speed of a moving target may vary over a relatively wide range, its Doppler frequency may vary also. If filtering apparatus with a bandwidth wide enough to accommodate all possible Doppler frequencies is used in the radar receiver, confusion may result between several targets having different speeds. Consequently, it becomes necessary to provide adjustable filtering means which can be made to lock on a particular single moving target. In the lock-on or acquisition process, the bandwidth of the aforesaid filtering means is adjusted to accommodate the Doppler frequency of a particular target while rejecting all other Doppler frequencies. In addition, means must be provided for keeping the filtering means automatically adjusted to accommodate for changes in the Doppler frequency of the target as its velocity changes.

It is an object of my invention to provide novel means for achieving velocity acquisition in Doppler radar. More specifically, it is an object of my invention to provide means for achieving rapid acquisition by first using a wide Doppler filter to speed up the lock-on process and shortly thereafter injecting a narrower filter to provide for better velocity discrimination. This technique results in the joint relaization of a relatively short acquisition time due to the increased information build-up permitted by the wide pass band filter and the ability to discern targets differing in velocity by virtue of the narrow pass band filter.

Further objects and features of the invention will become apparent from the following detailed description taken in connection with the accompanying drawings which form a part of this specification and in which.

Figure 1:
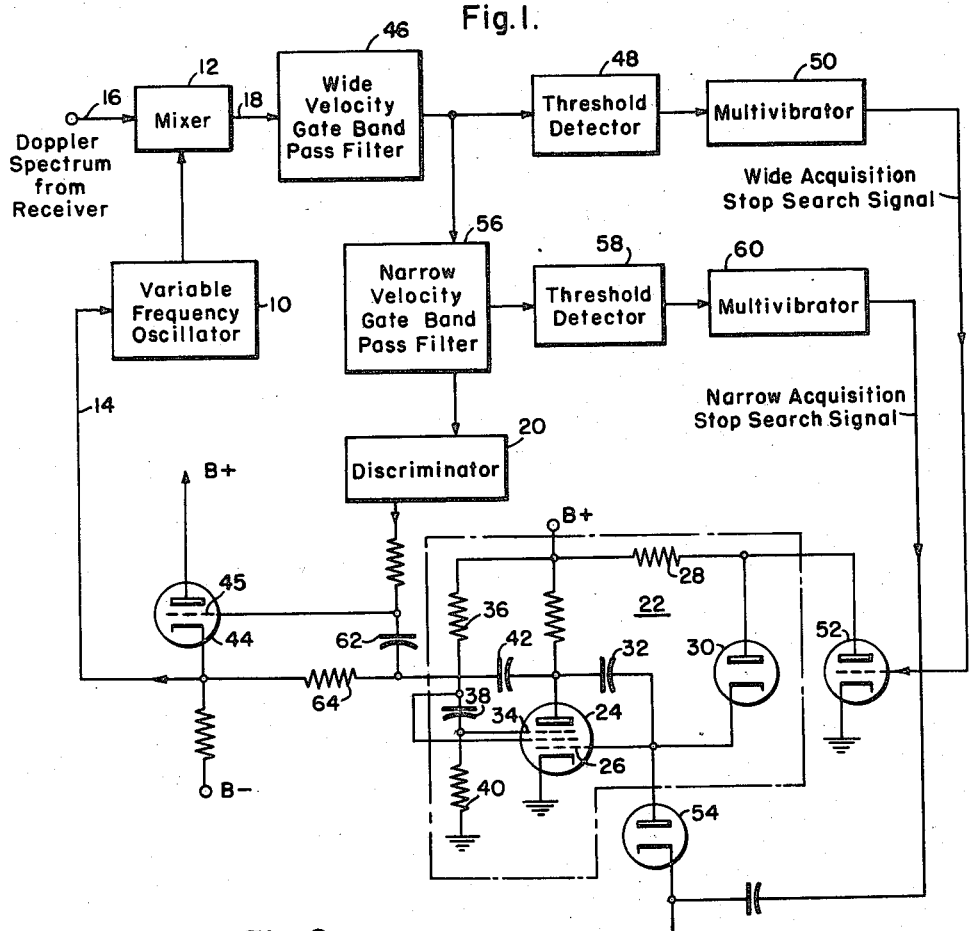
Figure 1 is a block and schematic diagram illustrating my invention.

Referring to Fig. 1, the system shown comprises a variable frequency oscillator 10, the output of which is fed to a mixer 12. The output frequency of oscillator 10 is controlled in a manner well known to those skilled in the art by a direct current control voltage applied to lead 14. Detected video return signals from the radar receiver, not shown, are applied to terminal 16 and are heterodyned with the output of oscillator 10 to produce an intermediate frequency signal appearing on lead 18.

Figure 2:
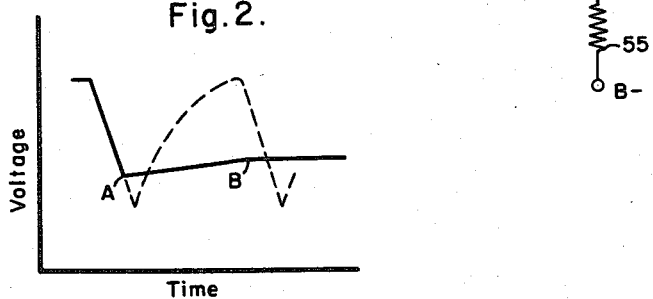
Fig. 2 is a waveform illustrating the operation of the sawtooth wave generator shown in the diagram of Fig. 1.

The control voltage applied to lead 14 can be produced by a discriminator 20 or a sawtooth wave generator 22, enclosed by broken lines. Generator 22 is fully shown and described in my copending application Serial No. 533,403, filed September 9, 1955, and assigned to the assignee of the present application. It comprises a pentode vacuum tube 24 having control, screen and suppressor grids included therein. The control grid 26 is connected to a source of positive potential through resistor 28 and a diode 30. Under normal operating conditions, diode 30 is biased in the forward direction, and its effect is negligible. A capacitor 32 is connected between the plate of pentode 24 and control grid 26 to render the circuit a feedback or operational integrator. Whenever pentode 24 is conducting, a negative going voltage waveform will appear at its plate by virtue of the flow of current through resistor 28. The slope of the waveform is determined in obvious manner by the RC product of resistor 28 and capacitor 32. Conduction through pentode 24 is controlled by suppressor grid 34 in order to render the stage free-running. This is accomplished by the voltage developed across screen resistor 36, coupled to the suppressor grid through capacitor 38. With this arrangement, the circuit is made free-running by virtue of a transitron effect. Whenever pentode 24 conducts, its plate voltage decreases linearly until a low value is reached at which the screen current begins to exhibit a rapid increase. When this occurs, a negative voltage is developed across resistor 36 and is coupled to the suppressor grid by capacitor 38. The result is a regenerative action which serves to cut off the plate voltage. Plate current remains cut off until capacitor 38 discharges through resistor 40 enough to permit the cutoff value of the suppressor grid to be overcome. In this manner the nonconducting period of pentode 24 can be controlled by the values of capacitor 38 and resistor 40. A repetitive, negative going sawtooth waveform, as shown in Fig. 2, will appear at the plate of pentode 24. This voltage is coupled to oscillator 10 through capacitor 42 and the cathode of triode 44 as shown.

By applying the sawtooth output of generator 22 to oscillator 10, its output frequency is varied periodically between predetermined limits. Consequently, the difference frequency output of the mixer 12 will vary also. The Doppler frequencies from moving targets received by the radar system will produce difference frequencies on lead 18 falling within a definite frequency band. The output of mixer 12 is applied to band pass filter 46 (called a wide velocity gate) which has a band pass wide enough to permit an adequate rate of search of the total frequency region anticipated. This process may be referred to as a wide velocity gate search.

In accordance with established filter theory, a Doppler signal from a moving target, when encompassed by the wide velocity gate, will build up in amplitude at a rate inversely proportional to the band width of the filter. If the filter output is sufficient to distinguish it from random noise, its presence is sensed by an amplitude sensitive threshold detector 48 which, in turn, triggers a multivibrator 50 or other similar switching device. When multivibrator 50 is triggered, it applies a positive bias to the control grid of triode 52. Hence, the triode, which is normally cut off, conducts to apply a negative bias to the anode of diode 30. With diode 30 now cut off, the remaining path for current to flow through capacitor 32 is diode 54 and resistor 55 to the negative terminal of an anode voltage source (marked by B—). This path now controls the operation of the sawtooth wave generator 22. The result of this action is a positive going linear rise in voltage of low slope, starting at point A as indicated in Fig. 2. The relative slope of this rise is determined in obvious maner by the value of resistor 55 and the magnitude of the B— voltage source.

The variable frequency oscillator 10 is now at a frequency to produce a difference frequency in mixer 12 somewhere within the wide velocity gate band pass. It is now desired to provide better velocity discrimination of the target. To this end, the output of a narrow velocity gate band pass filter 56 is examined. By virtue of the low slope of the positive going waveform starting at point A in Fig. 2, a fine sweep of the variable frequency oscillator 10 in a sense opposite that previously used is effected. Since the velocity or frequency region to be earched is now smaller than before, a smaller voltage excursion is needed. The opposite direction of search is employed in this phase of operation since the tendency is for the original search signal to have over-swept the target. The sweep rate of the voltage applied to oscillator 10 is now slower (i. e., its slope is lower) since the buildup time of the signal through narrow gate band pass filter 56 is slower than that of filter 46 due to its reduced bandwidth.

When the narrow gate band pass of filter 56 encompasses a signal, its output builds up and is sensed by threshold detector 58 which, in turn, triggers multivibrator 60. The resulting positive output from multivibrator 60 cuts off diode 54 by virtue of a positive bias applied to its cathode. The control grid 26 of pentode 24 is now effectively disconnected from the circuit, and the sawtooth wave generator 22 acts as a storage circuit by virtue of a degenerative feedback voltage through capacitor 32 which maintains its output voltage constant, starting at point B in Fig. 2 until the discriminator 20 can build up sufficient current to assume control of the voltage at grid 45 of the triode 44.

During this time, the output voltage of sweep generator 22 is applied via the cathode of triode 44 to oscillator 10 to maintain its frequency constant. As the speed of the target being tracked varies, its Doppler frequency and the difference frequency from mixer 12 will vary also. In order to compensate for this variation and maintain the difference frequency within the pass band of filter 56, discriminator 20 is employed. Part of the signal passing through filter 56 is applied to the discriminator. When the Doppler frequency of the target changes, the resulting change in the difference frequency output of mixer 12 will cause the discriminator 20 to produce an output current which produces a voltage change at grid 45, the polarity of which depends upon the direction of frequency departure. This output voltage is applied via the cathode of triode 44 to oscillator 10 to adjust its output frequency so that the difference frequency output of mixer 12 falls within the pass band of filter 56. In this manner, the discriminator 20 will compensate for difference in the Doppler frequency due to changes in target velocity once the system has "locked on" a particular target by the process described above. Capacitors 42, 62 and resistor 64 serve to determine the properties of the closed tracking loop.

Although I have described my invention in connection with a certain specific embodiment, it should be readily apparent to those skilled in the art that various changes in form and arrangement of parts can be made to suit requirements without departing from the spirit and scope of the invention.

I claim as my invention:

1. In a Doppler radar system adapted to receive reflected energy from a distant object, the combination of a variable frequency oscillator the output frequency of which varies as a function of a control voltage applied thereto, means for applying a sawtooth control voltage to said oscillator to vary its output frequency periodically between predetermined limits, means for mixing said received energy with the output of said variable frequency oscillator, a first band pass filter connected to the output of said mixer, means for detecting energy passing through said first band pass filter, means responsive to the output of said detecting means for changing the rate of change of the output of said sawtooth wave producing means, a second band pass filter connected to the output of said first band pass filter, said second band pass filter having a pass band narrower than the pass band of said first filter, means for detecting energy passing through said second filter, and means responsive to the output of said latter-mentioned detecting means for causing said sawtooth wave producing means to hold its output voltage constant at its last value when energy passes through said second filter.

2. In a Doppler radar system adapted to receive reflected energy from a distant object, the combination of a variable frequency oscillator, a device for causing said oscillator to periodically vary its output frequency in a direction from one predetermined frequency to another, means for heterodyning said received energy with the output of said oscillator, a first filter connected to the output of said heterodyning means, said filter being adapted to pass a limited band of frequencies, means for detecting energy passing through said first filter, means associated with said frequency varying device and responsive to the output of said detecting means for causing said device to reverse the direction of frequency variation of said oscillator and to reduce its rate of frequency variation, a second filter connected to the output of said first filter, said second filter being adapted to pass a narrow band of frequencies within the band of frequencies passed by said first filter, means for detecting the output of said second filter, means associated with said frequency varying device and responsive to the output of said latter-mentioned detecting means for causing said device to hold the output frequency of said oscillator constant, a discriminator connected to the output of said second filter, and means for applying the output of said discriminator to said oscillator whereby variations in the output of the discriminator will cause corresponding variations in the output frequency of said oscillator.

3. In a signal receiving system, the combination of a variable frequency oscillator, means for causing said oscillator to vary its output frequency periodically between predetermined limits, means for mixing energy received by said system with the output of said oscillator, a first filter connected to the output of said mixing means, said filter being adapted to pass a limited band of frequencies, means for detecting energy passing through said first filter, means responsive to the output of said detecting means for changing the periodic variation in the output frequency of said oscillator, a second filter connected to the output of said first filter, said second filter being adapted to pass a narrow band of frequencies within the band of frequencies passed by said first filter, means for detecting the output of said second filter, and means responsive to the output of said latter-mentioned detecting means for causing said oscillator to hold its output frequency constant.

4. In a Doppler radar system adapted to filter out received signals other than signals having a Doppler frequency of a moving target, the combination of filtering means for performing a wide band velocity search, filter means for performing a slower narrow band velocity search after a target is detected by said wide band search, said narrow band search being made in a sense opposite to said wide band search, and means operatively connected to the filter means and to the filtering means and responsive to the output of the filtering means as it performs said wide band velocity search for initiating said narrow band search by said filter means.

5. In a signal receiving system, the combination of means for heterodyning received signals to produce an intermediate frequency signal which varies periodically between predetermined frequency limits, a first filter connected to the output of said heterodyning means, means responsive to signals passing through said first filter for altering operation of said heterodyning means, a second filter connected to the output of said first filter, and means responsive to signals passing through said second filter for causing said heterodyning means to hold its output intermediate frequency constant.

6. In combination with a source of signals of variable frequency, means for heterodyning said source of signals to produce an intermediate frequency signal, a first filter connected to the output of said heterodyning means, means responsive to signals passing through said first filter for altering operation of said heterodyning means, a second filter connected to the output of said first filter, and means responsive to signals passing through said second filter for causing said heterodyning means to hold its output intermediate frequency constant.

References Cited in the file of this patent

UNITED STATES PATENTS

| | | |
|---|---|---|
| 2,630,528 | Kamphoefner | Mar. 3, 1953 |
| 2,688,743 | Berger et al. | Sept. 7, 1954 |